(12) United States Patent
Renn et al.

(10) Patent No.: US 6,568,420 B2
(45) Date of Patent: May 27, 2003

(54) VALVE BOX

(75) Inventors: Daniel John Renn, Bellevue, WA (US); Steven Jacobs, Seattle, WA (US)

(73) Assignee: Saint-Gobain Performance Plastics Corporation, Worcester, MA (US)

( * ) Notice: Subject to any disclaimer, the term of this patent is extended or adjusted under 35 U.S.C. 154(b) by 0 days.

(21) Appl. No.: 09/798,632

(22) Filed: Mar. 2, 2001

(65) Prior Publication Data

US 2002/0069914 A1 Jun. 13, 2002

Related U.S. Application Data

(60) Provisional application No. 60/254,731, filed on Dec. 11, 2000.

(51) Int. Cl.⁷ .............................................. F16K 27/12
(52) U.S. Cl. ...................... 137/377; 137/312; 137/382; 220/3.94; 220/4.01; 220/4.32
(58) Field of Search ................................. 137/377, 382, 137/312; 220/3.94, 4.01, 4.32

(56) References Cited

U.S. PATENT DOCUMENTS

| | | | | |
|---|---|---|---|---|
| 4,238,045 A | * | 12/1980 | D'Andria ..................... | 220/714 |
| 4,520,852 A | * | 6/1985 | Klein .......................... | 141/86 |
| 5,133,498 A | * | 7/1992 | Sealy et al. .................. | 239/68 |
| 5,381,902 A | * | 1/1995 | Dumser et al. .............. | 137/377 |
| 5,555,907 A | * | 9/1996 | Philipp ........................ | 137/312 |
| 5,743,289 A | * | 4/1998 | Griffin et al. ............... | 137/341 |
| 5,915,414 A | * | 6/1999 | Seaman et al. ............. | 137/382 |

* cited by examiner

*Primary Examiner*—A. Michael Chambers
(74) *Attorney, Agent, or Firm*—Grant T. Langton, Esq.; Jeffer, Mangels, Butler & Marmaro LLP

(57) ABSTRACT

Valve boxes of this invention comprise a housing including an inner chamber that extends axially through the housing from a housing base. The housing chamber includes a diameter that is defined by a housing sidewall surface that extends outwardly from the base, forming a chamber opening. The chamber opening includes a seal surface that is positioned radially inwardly towards the chamber. The valve box further includes a lid that is positioned over the housing chamber opening. The lid includes a concave center section and a seal surface disposed radially therearound. The lid seal surface is positioned radially towards the chamber, and is placed opposite the chamber opening seal surface. An annular seal is interposed between the housing chamber and lid seal surfaces. The chamber and lid seal surfaces are configured generally perpendicular to the chamber opening, such that internal pressure within the chamber causes the concave center portion to impose a radially outwardly directed pressure onto the lid, thereby further compressing the annular seal to ensure a leak-tight seal.

28 Claims, 3 Drawing Sheets

Compressive Force
When Lid Is Under Pressure

VALVE BOX

CROSS-REFERENCE TO RELATED APPLICATION

This application claims the benefit of provisional application No. 60/254,731, filed on Dec. 11, 2000.

FIELD OF THE INVENTION

This invention relates to an enclosure known within the industry as a valve box. The valve box is used to enclose fluid handling devices, such as a valve and manifold system, for the purpose of containing fluid leaks and, more particularly, specifically designed to provide an improved degree of fluid containment should the system be under pressure.

BACKGROUND OF THE INVENTION

In certain industries caustic chemicals are used in processing stages that necessitate special handling precautions. The special handling precautions implemented depend upon the particular process operation and the type of product being produced. In instances, the special handling precaution can be limited to the selection of materials, making sure that the material selected to build the fluid handling system does not fail when exposed to the process chemicals. In other instances, it is desired that the material selected to form the wetted portion of the fluid handling system not introduce contaminate materials in the process during use, to thereby avoid contaminating an otherwise ultra-pure process. Further, special handling precautions are taken to provide a containment system around a primary fluid handling device that contains the process fluid, to thereby limit its exposure to the environment and minimize any related health risk or environmental impact, should the primary fluid handling device leak or fail.

In the semiconductor industry, in particular, extremely acidic chemicals are used during the process of making semiconductors. The process of making semiconductors also requires that the processing liquid be of a high purity level, to not contaminate the final product. Therefore, an additional requirement is that the material selected for making the wetted fluid handling device not introduce containment material into the system during processing. Fluoropolymeric tubing is commonly used for transporting chemicals used in the semiconductor processing operation, but is relatively soft and therefore requires use of a secondary containment system to protect against any potential leakage or rupture.

Valves used in the semiconductor industry to transport such chemicals are also contained, to protect against potential leakage, by use of a valve box. Valve boxes are designed to enclose the valve, manifold and associated connecting tubing or hosing, and are intended to withstand both vapor exposure (that can permeate through fluoropolymeric tubing) and short term liquid exposure in the event of a valve, fitting, or tubing leak. Valve boxes known in the art are constructed with flat, opaque polypropylene that is first cut to size, and then air welded together in the form of a box. Polypropylene is selected because it is extremely economical, easy to weld, and durable. Clear PVC is typically used as a window, across the front opening of the box, to allow one to view the fluid handling system contained within. The window is also removable to allow access to the system to make desired valve adjustments and/or inspections.

Such known valve boxes include an O-ring seal that is compressed between the window and the valve box housing, and that operates to prevent leakage of gas or liquid from the valve box. The seal is held in place, between the window and housing, by a plurality of machine screws that extend through opposed flange portions of the window and box. The flange portions are oriented parallel with each other, and with the remaining surfaces of the box and window, and extend along the edge portion of the box and window. The seal is interposed between the two flange portions, and is compressed by the tightened machine screws. This type of seal arrangement is referred to as a "face seal" because the seal is simply positioned between the opposed flat face of the window and box flanges. With such a face seal arrangement the seal is compressed in a direction that is parallel to the axis of the screws.

Such known valve boxes also include one or more polypropylene fittings welded to one or more side surfaces of the box for making connections with necessary secondary containment piping and/or for running electrical wires and other noncritical tubing through the box. PVC fittings are threaded into the polypropylene fittings in order to make the transition to the secondary containment system, which must have PVC-to-PVC connections for solvent bonding to be effective. Such a known valve box is typically hung on a wall, or attached to a rack. After the valve has been installed within the box, and all necessary fluid connections made, it is typically tested to ensure that it can serve its intended function. Valve boxes known in the art, constructed in the manner described above, must be able to endure a leak test as part of an overall secondary containment system at a pressure of 1 psig for a period of one hour.

While known valve boxes, constructed in the manner described above, do provide some degree of secondary containment protection to a fluid handling system, they do suffer from some disadvantages. For example, while the use of sheet polypropylene to construct such valve boxes is cost effective from a material perspective, the task of cutting and welding together as many as 15 separate pieces is a time consuming and costly process. Additionally, such construction method produces a box that is heavy for its size, thereby limiting potential mounting and/or placement options.

A major issue and concern associated with such known valve boxes is the seal design and its susceptibility to leaking when the box is pressurized. As pressure builds up within the box, due either to air during a pressure test or to fluid leaking from tubing or the enclosed fluid handling device, it acts to push the window outwardly away from the box opening. This outwardly directed pressure force causes the opposed flanges to be pushed away from one another, i.e., in a direction opposite from the compression force imposed from the machine screws, thereby causing the seal to be unloaded. Such unloading of the seal can result in gas and/or fluid leakage from the valve box.

Another problem with the conventional valve box construction is the design of its box having a flat bottom that opens to the flange. This design does not provide a barrier of any sort to prevent leaking liquid from running out of the box once the window is opened or removed. Another problem with such conventional valve boxes is the use of opaque polypropylene material to build the box, which makes it difficult to observe leaks or drips within, at locations remote from the window. A still other problem associated with such known valve boxes is the need to use polypropylene fittings, as they add unnecessarily to the cost of the box and merely serve as a transition from the polypropylene box to the PVC pipe in the secondary containment system.

Accordingly, it is desired that a valve box be constructed in such a manner that addresses the problems as noted above. It is desired that a valve box be constructed in a manner that: (1) is both time and cost efficient; (2) provides a seal arrangement that is not susceptible to leakage from built up pressure within the housing; (3) protects against the leakage of fluid from the housing upon opening of a valve box lid or window; (4) provides a transparent housing to enable easy visual observation of leaks and drips within the housing; (5) does away with the need to provide polypropylene fittings and (6) provides a reduction in overall weight for installation and handling purposes.

SUMMARY OF THE INVENTION

Valve boxes, constructed according to principles of this invention, are configured having a self-energizing sealing arrangement that produces an increased sealing force with increased internal pressure, thereby improving the ability to provide a leak-tight seal in the event of liquid leakage within the box. Valve boxes of this invention generally comprise a housing including an inner chamber that extends axially through the housing from a housing base. The housing chamber includes a diameter that is defined by a housing sidewall surface that extends outwardly from the base, forming a chamber opening. The chamber opening includes a seal surface that is positioned radially inwardly towards the chamber.

The valve box further includes a lid that is positioned over the housing chamber opening. The lid includes a concave center section and a seal surface disposed radially therearound. The lid seal surface is positioned radially towards the chamber, and is placed opposite the chamber opening seal surface. An annular seal is interposed between the housing chamber and lid seal surfaces. The chamber and lid seal surfaces are configured generally perpendicular to the chamber opening such that internal pressure within the chamber causes the concave center portion to impose a radially outwardly directed pressure onto the lid, thereby further compressing the annular seal to ensure a leak-tight seal.

BRIEF DESCRIPTION OF THE DRAWINGS

The features and advantages of the present invention as described herein are better understood by referencing the following description and accompanying drawings.

DETAILED DESCRIPTION

Valve boxes of this invention include a box and lid that are specifically designed to provide a seal mechanism capable of providing a leak-tight containment of an enclosed valve and related tubing/hosing/sensors at pressurized internal environments of at least 5 psig.

Figure 1:
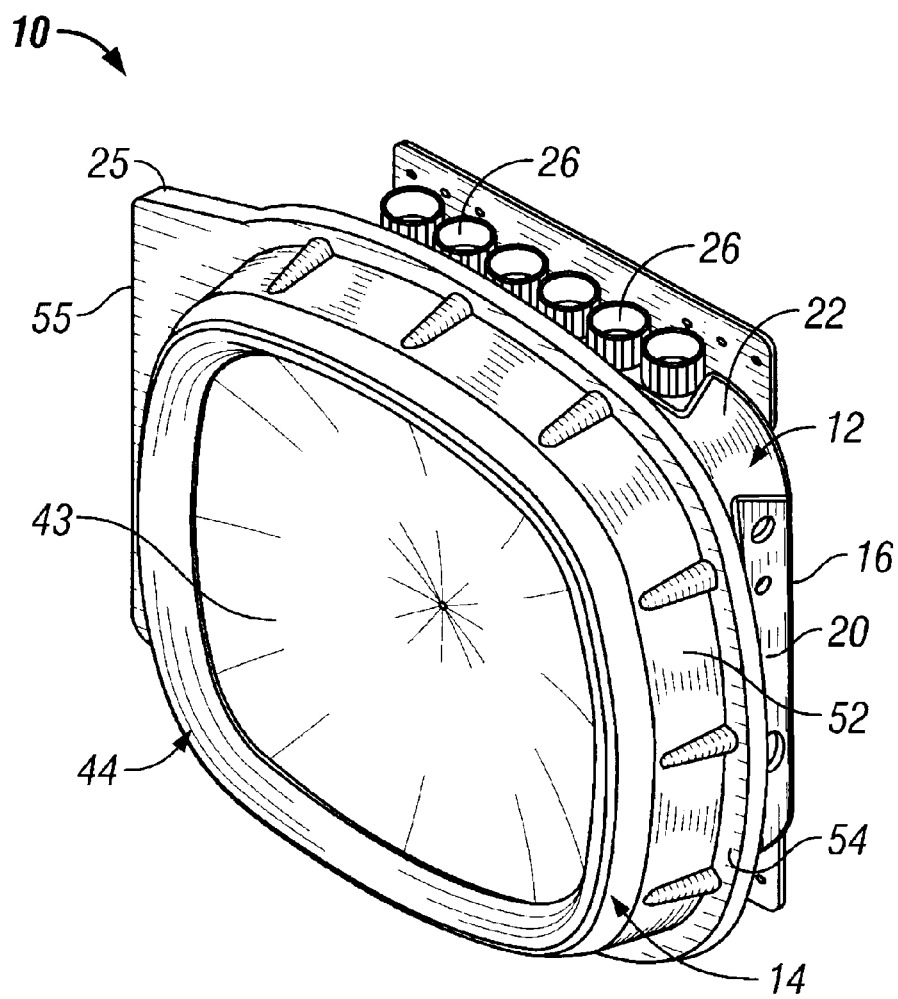
FIG. 1 is schematic perspective view of a valve box constructed according to principles of this invention.
Figure 2:
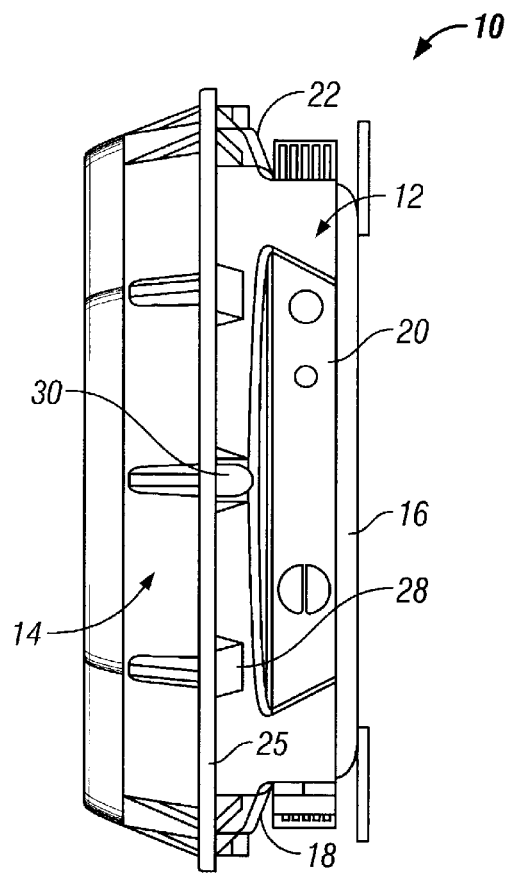
FIG. 2 is a schematic side view of the valve box of FIG. 1.
Figure 3:
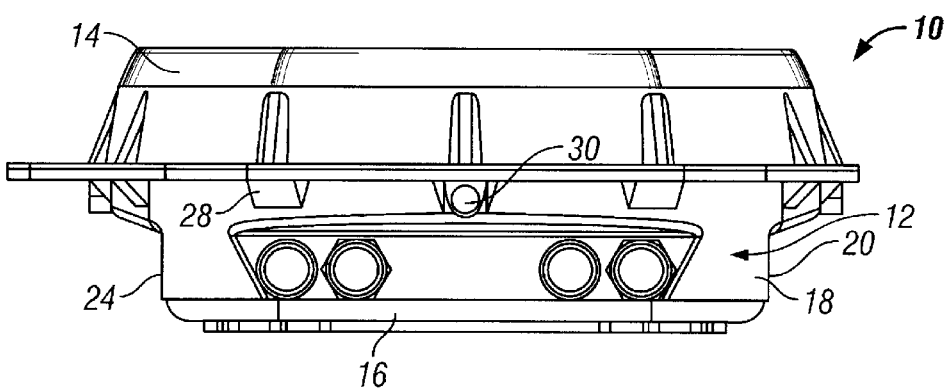
FIG. 3 is a schematic bottom view of the valve box of FIGS. 1 and 2.

FIGS. 1 to 3 illustrate a valve box 10, constructed according to principles of this invention, generally comprising a box 12 and a lid 14. The box 12 structure is comprised of a base 16 and four side walls 18, 20, 22 and 24 that are oriented perpendicular to the base 16. The four side walls project outwardly from the base to define an opening of the box. The box is formed from a polymeric material, in a preferred embodiment, type II clear PVC.

The box 12 can be formed by a molding process. In an example embodiment, the box is formed by a thermoforming method, and more preferably, by twin sheet vacuum forming, whereby two sheets of material are heated to a desired temperature and vacuum formed simultaneously to form the hollow part, e.g., a box structure. After molding, the panel opposite the base of the hollow part is trimmed to the desired geometry.

The thermoforming method of making the box is desired because it drastically reduces the labor and time necessary to make a box, when compared to the conventional valve box construction method of welding multiple panels together. Accordingly, the molding method increases manufacturing efficiency, thus reducing manufacturing costs. Further, the twin sheet thermoforming method enables production of a thick material region surrounding the housing opening, where the two sheets are joined together, and which defines a flange 25 (FIG. 1) that is capable of supporting a desired attachment mechanism, e.g., a hinge, to permit attachment with the lid 14.

Another advantage of constructing the box by the thermoforming method is the ability to overcome flat sides and sharp corners, which are not desired in the design of structures being designed to hold pressure. Accordingly, in a preferred embodiment, the box 12 of this invention includes rounded corners and generally rounded side wall surfaces. As mentioned above, the box includes a flange or lip 25 that extends a distance perpendicularly outwardly away from the box side walls. The flange 25 provides a mating surface for a complementary portion of the valve box lid 14 to facilitate attachment therewith by means described below.

The box base and side walls are configured to accommodate placement of a desired valve within the box, to accommodate attachment of the valve to the box, and to accommodate the necessary routing of tubes/hoses and/or electrical wires to the valve from outside the box. In an example embodiment, the box 12 may include one or more fittings 26 that are attached to one or more box side walls. Since the box is itself formed from PVC, unlike conventional valve boxes formed from polypropylene, there is no need to first attach a transition fitting to the box before attaching PVC fittings to the box. Rather, PVC fittings of the secondary containment system can be connected directly to the box, thereby avoiding further manufacturing time and expense.

The PVC fittings 26 can be attached to the box by welding, bonding or gasketed clamping method. The welding process can be carried out by a hot air welding, wherein the fittings are welded to the inside and outside side wall surfaces of the box. In a preferred embodiment, the PVC fittings 26 are attached to the box by a friction welding process that is more time efficient welding, wherein the fitting is spun against the box to cause friction between the fitting and side wall of the box to a point where both materials soften and fuse together. Spin welding is preferred because it provides a more consistent, dependable weld, requires significantly less skill to perform, and provides a virtually guaranteed liquid-tight secondary enclosure system without having to relying on a threaded or hot air welded junction.

FIGS. 2 and 3 illustrate other sides 20 and 18, respectively, of the box to which other fittings can be attached. The exact placement of fittings, types of fittings, and number of fittings attached to the valve box housing 12 is understood to vary depending on the particular valve box application, e.g., the type of valve installed within the box. Accordingly, it is to be understood that the box fittings as illustrated in these figures is provided for purposes of reference and is not intended to limit number, type, or placement of fittings on the box.

Referring now to FIGS. 2 and 3, the box 12 can also include a number of gussets 28 that extend from a bottom surface of the flange 25 to an outside surface of the box side walls 18, 20, 22 and 24. The gussets 28 can be in the form of ribs that function to provide structural support and help stabilize to the flange 25. In an example embodiment, the box 12 includes a plurality of gussets 28 that are spaced equidistantly therearound to provide a uniform support structure for the flange.

As best illustrated in FIGS. 2 and 3, the box side wall surfaces 18, 20, 22 and 24 are configured having a stepped shape comprising a first section that extends away from the base 16 a determined distance or length, and a second section that extends away from first section and that is flared outwardly a distance from the first section. This stepped side wall construction is intentionally designed for the purpose of providing a low point in the box for the collection of any leaking liquid. Thus, any liquid that has leaked from within the valve box would run by gravity to the bottom of the box and move along the sidewall 18 from the first section to the relatively lower second section. The passage of liquid along the sidewall in this manner is aided by the rounded transition between the sidewall sections. A drain (see FIG. 3) is used to remove any collected liquid from within the valve box.

As shown in FIG. 3, the sidewall 18 forming the bottom of this example embodiment valve box includes a drain 30 positioned at the low point of each sidewall. If the particular orientation of the box is not known at the time of manufacture, or it is desired to manufacture a generically oriented valve box, the drains can be placed at the low point of each side wall surface (e.g., see FIG. 2 drain 30).

Figure 4:
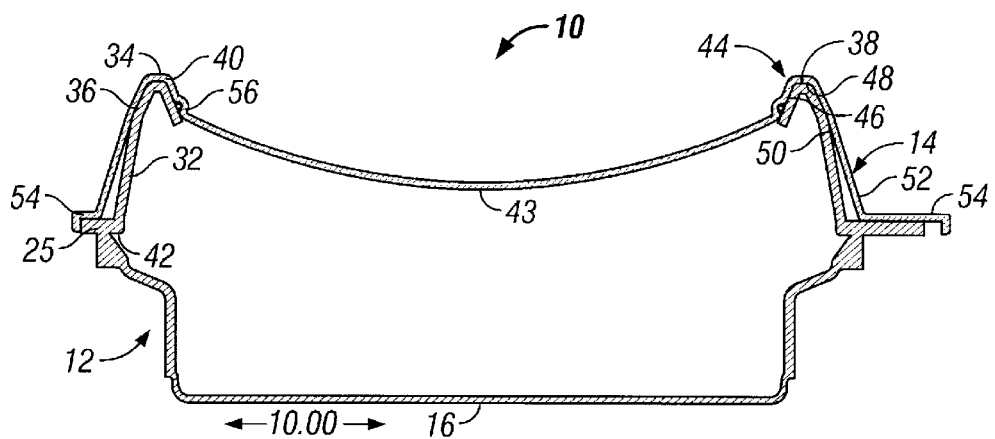
FIG. 4 is a cross-sectional side view of the valve box of FIGS. 1 to 3.

Referring to FIG. 4, the box 12 includes a collar 32 that is integral with the inside surface of the flange 25, that projects outwardly generally parallel to an axis running through the box from the base a distance away from the flange. The collar 32 includes a distal end, forming the open end of the box and is configured in the shape of a lip 34 from a portion of the collar directed inwardly into the box. Thus, the box opening includes a lip having three surfaces 36, 38 and 40 that are directed generally perpendicularly outwardly from, generally parallel with, and generally perpendicularly inwardly towards, the axis running though the housing from the base 16.

The collar 32 serves at least two functions. First, it provides a structure that prevents liquid that has leaked within the valve box from running out of the valve box when the lid is removed, i.e., acts as a fluid barrier. The fluid barrier function is provided by both a ridge 42 formed from a portion of the flange projecting inwardly into the box housing, and the inwardly directed surface 40 of the collar lip 34. Secondly, the collar provides a sealing structure for the lid, as will be better explained below, that acts to enhance the sealing effect during valve box pressurization. The box collar (described in the above structural elements of the valve box) is integral with the box and formed via the thermoforming process.

Figure 5:
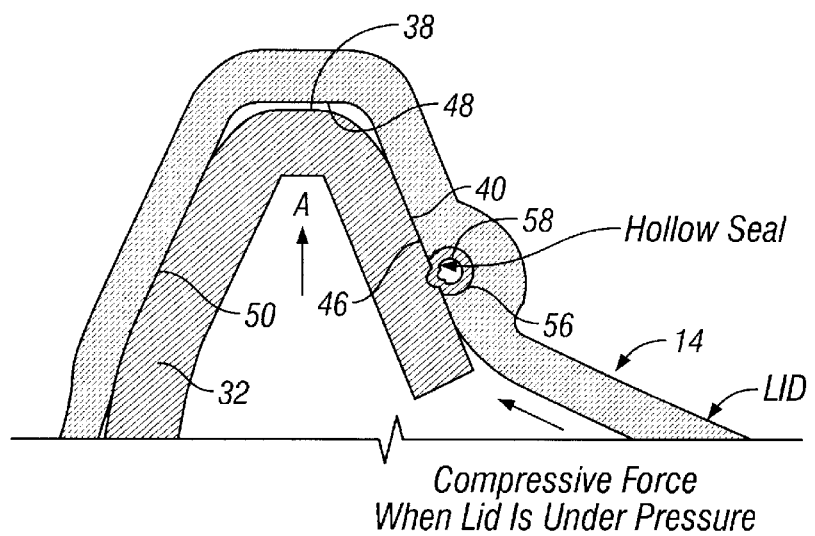
FIG. 5 is a cross-sectional side view of an enlarged section of the valve box of FIGS. 1 to 4.

As discussed briefly above, the valve box 10 includes a lid 14 that is positioned over the opening of the box 12. Referring to FIGS. 1 and 4, the lid 14 includes a concave center section 43 that is defined along an outside perimeter by a raised lip 44. The concave section 43 is designed to depend inwardly a distance into the box opening, and has a generally constant radius of inward curvature. Referring to FIGS. 4 and 5. The raised lip 44 (referring to the orientation of the valve box in FIG. 4) includes an inwardly directed surface 46 configured for placement against the outwardly directed box collar surface 40, and a horizontal surface 48 configured for placement against the horizontal collar surface 38 of the box, and an inwardly directed surface 50 configured for placement against an outwardly directed surface 32 of the box collar lip.

Referring to FIGS. 1 and 4, the lid 14 further includes a sidewall 52 that extends outwardly away from the lip 44 and is configured and sized to run around the box collar 32. The lid sidewall 52 is defined at a distal end by a flange 54 that is sized and configured to fit against the box flange 25. The lid sidewall 52 is configured having a slight outward flare, moving from the lip 44 to the flange 54, to enable placement of the lid flange 54 over the collar lip 34 when placing the lip over and removing the lid from the box opening. The lid sidewall 52 is sized such that a compression force is imposed between the lid lip and the collar lip surfaces when the lid is positioned into a closed position against the box. Configured in this manner, the lid is designed to fit entirely over the box opening to form a compression fit against the box collar 32 and collar lip 34 surfaces.

The lid is preferably formed from the same type of material used to form the box, e.g., PVC. The lid, like the housing, can be formed using the thermoforming process for purposes of improving manufacturing efficiency and reducing manufacturing costs.

The lid can be attached to the box in a number of different ways, depending on the particular valve box application. For example, the lid can be attached at one of its flange ends 55 (FIG. 1) by the use of a hinge assembly (not shown), or other means that enables attached movement of the lid vis-a-vis the box. The lid can be tightened down onto the box using a variety of conventional tightening or attaching means, e.g., threaded attachment by use of machine screws that are tightened into and/or through the respective housing and lid flanges, or clamped attachment by the use of hinge clamps or the like that are clamped around the flanges.

Referring to FIGS. 4 and 5, the lid includes a seal 56 that is disposed within a groove 58 provided in the lid outwardly directed surface section 46. The seal 56 is in the form of a continuous member that is disposed completely around the surface section 46, and is positioned along the lid surface section 46 such that it makes compression contact with an opposed surface 40 of the collar lip 34. The seal 56 can be in the form of a solid or hollow construction, having a symmetrical (e.g., an O-ring) or asymmetrical cross section.

For use in the semiconductor industry, or other applications call for the use of extremely acidic or corrosive chemicals, it is desired that the seal be formed from a chemically resistant material, e.g., Viton or the like. Alternatively, the seal can be formed from a non-chemically resistant material such as rubber, and be coated with a chemically resistant material to provide the needed degree of chemical protection. A key requirement of the seal, however, is that it provide a desired degree of squeeze when compressed, between the lid and the box, to resist given amount of pressure build up within the valve box. In an example embodiment, the seal 56 is configured having a round cross section, with a reduced radius when compared to the seal groove 58. This is desired because it allows the seal to fit into the seal groove 58 while still protruding some distance to create the contact required on surface 46 to maintain a liquid tight seal when the lid is in a closed position over the box. Additionally, in an example embodiment, the seal has a hollow construction, that is designed to provide an added amount of elastic squeeze deformation under compression to provide an enhanced sealing effect.

Referring to FIG. 4, the concave lid section 43 is designed to project inwardly inside of the housing a desired distance, parallel to the axis running through the housing from the base 16. In an example embodiment, the concave lid section 43 projects about midway along the housing collar 32. The concave lid section is designed in this manner, and is designed having deformable construction, for the specific purpose of providing a radially outwardly directed force to the lip 44 of the lid 14 in response to a built-up pressure force inside of the box. The pressure that becomes built up within the box imposes an outwardly directed force onto the concave lid section, that deforms the concave lid section outwardly a desired degree, and that translates to perpendicularly or radially directed force to the lid lip 44. This perpendicularly directed force serves to further compress the seal 56 between the opposed lid lip and housing collar lip surfaces, thereby enhancing the ability of the valve box to resist leakage with increasing internal pressure.

Thus, configured in this manner, the lid and housing geometry work together to form a self-energizing seal construction that provides improved resistance to increasing pressure built up within the valve box, when compared to conventional valve boxes that have sealing surfaces that move away from one another when exposed to pressurization within the box.

Valve boxes, constructed according to principles of this invention, display several advantages when compared to convention valve boxes as described above. Use of the thermoforming method for forming the valve box housing and lid enables the valve box to be formed in a single 15 minute forming cycle that requires less than 15 minutes of trimming, and that enables forming a box have rounded surfaces. This compared to the labor intensive multi-step process associated with cutting and welding multiple panels to produce a box having squared corners and surfaces.

Additionally, use of the thermoforming process enables production of a valve box that weighs roughly 40 percent less than that of a comparably sized conventional valve box, thereby facilitating system installation. Also, the ability to use spin welded fittings facilitates valve box construction and reduces the chance of a leaks using conventional fittings. Valve boxes of this invention are also configured having a liquid collection reservoir, without a welding step, to avoid fluid leaking from the housing upon opening or removing the lid. Also, valve boxes of this invention formed from transparent or clear PVC enable viewing into the box to observe fluid leakage from above, from the side, or from below the box. Further, valve boxes of this invention comprise a fluid drain that, in conjunction with the fluid reservoir, enable collected fluid within the box to be drained or removed therefrom from a safe distance.

The valve box feature of a self energizing seal is critical to being able to provide a valve box capable of meeting or exceeding a desired or necessary valve box pressure rating for use in certain applications. Conventional valve boxes are known to leak or fail during pressure testing up to 1½ psi. Valve boxes of this invention size are able to provide leak-tight service at pressures of at least 5 psi.

Other modifications and variations of valve boxes, constructed according to principles of this invention will be apparent to those skilled in the art. It is, therefore, to be understood that within the scope of the appended claims, this invention may be practiced otherwise than as specifically described.

What is claimed is:

1. A valve box comprising:
   a housing including a inner chamber extending axially through the housing from a base, the chamber diameter being defined by a sidewall surface extending outwardly from the base to form a chamber opening, the chamber opening including a seal surface that is positioned radially inwardly towards the chamber;
   a lid positioned over the housing chamber, the lid including a seal surface that is positioned radially outwardly towards the chamber and that is placed opposite the chamber opening seal surface; and
   an annular seal interposed between the housing chamber and lid seal surfaces.

2. The valve box as recited in claim 1 wherein the lid includes a concave center portion and the lid seal surface is positioned therearound.

3. The valve box as recited in claim 1 wherein the lid includes a sidewall section that extends form the lip seal surface and that is positioned around the lid, the lid sidewall section being positioned over the housing sidewall surface.

4. The valve box as recited in claim 1 the housing including a flange that extends outwardly around the housing sidewall section, the lid including a flange that extends outwardly therearound, the housing and lid flanges being placed into contact with one another.

5. The valve box as recited in claim 1 wherein the housing includes a liquid reservoir positioned along the housing sidewall section, and wherein the chamber opening has a diameter that is less than a diameter at the liquid reservoir.

6. The valve box as recited in claim 1 wherein the lid seal surface includes a groove recessed therein and the annular seal is partially disposed therein.

7. The valve box as recited in claim 1 wherein the housing is a one-piece construction that is formed from a polyvinylchloride material.

8. The valve box as recited in claim 1 wherein the lid further comprises:
   a concave center portion positioned radially inwardly of the lid seal surface, and axially inwardly into the housing chamber;
   a sidewall section positioned radially outwardly of the lid seal surface, and around the housing sidewall section; and
   a flange positioned radially outwardly of the lid sidewall section.

9. The valve box as recited in claim 8 wherein the housing includes a flange that extends outwardly around the housing sidewall section, the housing and lid flanges being placed into contact with one another.

10. The valve box as recited in claim 8 wherein the valve box is configured to provide increased sealing force onto the annular seal in response to internal pressure within the chamber by operation of the concave center portion imposing a radially-directed compression force onto the lid seal surface and the annular seal.

11. A valve box comprising:
   a housing comprising an inside chamber defined by a base and a sidewall section projecting outwardly from the base, the sidewall section including an end opposite the base that forms a chamber opening, the housing having a one-piece construction and including a flange that extends outwardly around the sidewall section and being interposed between the base and the chamber opening;

a lid removably attached to the housing and including:
  a concave center section that projects inwardly into the housing chamber;
  a raised lip extending around a perimeter of the concave center section and positioned around the chamber opening;
  a sidewall extending away from the lip and positioned adjacent an opposed surface of the housing sidewall section;
  a flange extending around the lid sidewall and being positioned against the housing flange; and an annular seal interposed between the lid and the housing; and means for securing the lid to the housing to compress the seal and provide a leak-tight therebetween.

12. The valve box as recited in claim 11 wherein the housing includes a lip disposed along the chamber opening, the lip being formed from a portion of the housing sidewall section adjacent the end that is directed inwardly towards the base.

13. The valve box as recited in claim 12 wherein the housing lip includes a seal surface that is directed radially inwardly towards the chamber.

14. The valve box as recited in claim 13 wherein the annular seal is disposed within a groove that is recessed within a surface of the raised lip opposite from the housing lip seal surface.

15. The valve box as recited in claim 11 wherein the housing sidewall section includes a drain port positioned at a point that is radially further from an axis running through the chamber than the chamber opening.

16. The valve box as recited in claim 11 wherein the housing includes a lip disposed along the chamber opening, the lip including a seal surface that is directed radially inwardly toward the chamber, the lid raised lip including a seal surface that is directed radially outwardly from the chamber and that is positioned adjacent the housing lip seal surface, the annular seal being interposed between the lid and housing lips seal surfaces such that outward movement of the lid concave center section imposes a compression force onto the annular seal.

17. The valve box as recited in claim 11 wherein the housing is formed from a polyvinylchloride material.

18. The valve box as recited in claim 17 wherein the housing includes one or more fittings disposed through the housing sidewall section, the fittings being in direct contact with the housing.

19. A valve box comprising:
  a housing including a inner chamber extending axially through the housing from a base, the chamber diameter being defined by a sidewall surface extending outwardly from the base to form a chamber opening, the chamber opening including lip positioned therearound having a seal surface that is positioned radially inwardly towards the chamber, the housing including a flange extending around the sidewall section and projecting radially outwardly therefrom;
  a lid attached to the housing and including:
    a convex center section positioned over the chamber opening;
    a lip positioned radially around the convex center section and including a seal surface that projects radially away from the chamber and that is positioned against the housing lip seal surface;
    a sidewall section extending radially outwardly from the lip seal surface and around the housing sidewall section; and
    a flange extending radially outwardly from sidewall section and in contact against the housing flange;
  an annular seal interposed between the housing and lid seal surfaces to provide a leak-tight seal therebetween.

20. The valve box as recited in claim 19 wherein the housing includes a liquid reservoir positioned along the housing sidewall section, and wherein the chamber opening has a diameter that is less than a diameter at the liquid reservoir.

21. The valve box as recited in claim 19 wherein the lid seal surface includes a groove recessed therein and the annular seal is partially disposed therein.

22. The valve box as recited in claim 19 wherein the housing is a one-piece construction that is formed from a polyvinylchloride material.

23. The valve box as recited in claim 19 wherein the housing is a one-piece construction that is formed by thermoforming molding method.

24. A valve box comprising a lid mounted over an integrally molded housing;
  the housing comprising a base, a wall extending from the base and defining a central cavity, a lip having a inwardly directed surface directing at the central cavity, and a flange having a radially extending surface, generally parallel with the base, disposed in between the lip and the base at an exterior surface of the housing;
  the lid comprising a mating lip having a complimentary inwardly directed surface sized to mate with the inwardly directed surface of the housing, a side wall extending downwardly and outwardly from the mating lip and having a flange extending from an end of the side wall, and a concave surface extending from the complimentary inwardly directed surface having an interior surface in communication with the central cavity of the housing;
  wherein the valve box further comprises a compressible sealing member disposed between the inwardly directed surface of the lip of the housing and the complimentary inwardly directed surface of the lip of the lid; and
  wherein the concave surface is adapted to exert an outwardly directed force on the complimentary inwardly directed surface located at the lip of the lid which then exerts a force against the inwardly directed surface of the lip of the housing when a force is exerted on the interior surface of the concave surface.

25. The valve box of claim 24, wherein the complimentary inwardly directed surface of the lid comprises a groove and the compressible sealing member is disposed at least partially within the groove.

26. The valve box of claim 24, wherein the housing comprises a plurality of fittings frictionally welded, heat welded, or mechanically coupled to the wall of the housing.

27. The valve box of claim 24, wherein the housing is formed by a thermoforming molding method using PVC.

28. The valve box of claim 24, wherein the lip of the lid comprises a generally flat surface in between the complimentary inwardly directed surface and the side wall.

* * * * *